(12) United States Patent
Ramanujam et al.

(10) Patent No.: US 12,051,932 B2
(45) Date of Patent: Jul. 30, 2024

(54) METHOD AND SYSTEM FOR OPTIMIZING OPERATION OF BATTERY PACK OF AN ELECTRIC VEHICLE

(71) Applicant: Tata Consultancy Services Limited, Mumbai (IN)

(72) Inventors: Muralikrishnan Ramanujam, Pune (IN); Shashank Agarwal, Pune (IN); Venkata Sudheendra Buddhiraju, Pune (IN); Aditya Pareek, Pune (IN); Swati Sahu, Pune (IN); Venkatramana Runkana, Pune (IN); Saurabh Jaywant Desai, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 526 days.

(21) Appl. No.: 17/453,606

(22) Filed: Nov. 4, 2021

(65) Prior Publication Data

US 2022/0149645 A1    May 12, 2022

(30) Foreign Application Priority Data

Nov. 10, 2020  (IN) .............................. 202021049089

(51) Int. Cl.
*H02J 7/00* (2006.01)
*B60L 53/60* (2019.01)
*B60L 58/12* (2019.01)

(52) U.S. Cl.
CPC .......... *H02J 7/00712* (2020.01); *B60L 53/60* (2019.02); *B60L 58/12* (2019.02); *H02J 7/00032* (2020.01); *H02J 7/0014* (2013.01); *H02J 7/005* (2020.01); *H02J 7/0063* (2013.01); *H02J 7/007192* (2020.01)

(58) Field of Classification Search
CPC ................................. B60L 53/60; B60L 58/12
See application file for complete search history.

(56) References Cited

U.S. PATENT DOCUMENTS

2017/0372349 A1* 12/2017 Fukuda .............. G06Q 30/0244

FOREIGN PATENT DOCUMENTS

| CN | 110148336 A | 8/2019 |
|---|---|---|
| WO | WO2016151336 A1 | 9/2016 |
| WO | WO2019017991 A1 | 1/2019 |

\* cited by examiner

*Primary Examiner* — Robert Grant
(74) *Attorney, Agent, or Firm* — FINNEGAN, HENDERSON, FARABOW, GARRETT & DUNNER, LLP

(57) ABSTRACT

The efficient operation of an electric vehicle depends greatly on proper functioning of a battery pack in the electric vehicle. A system and method for optimizing the operation of the battery pack in an electric vehicle is provided. The system comprises a digital twin for a battery pack in an electric vehicle. The system determines the state of charge, state of health and temperature distribution in the battery pack using various models. This information can be used to predict optimal charge and discharge profiles of the battery pack for given load conditions, as well as remaining useful life of the battery. The digital twin would require inputs such as battery temperatures from the sensors, coolant flow rates, coolant temperature, ambient temperature, load on the vehicle, current and voltages from the pack and battery characteristics from the manufacturer.

16 Claims, 14 Drawing Sheets

METHOD AND SYSTEM FOR OPTIMIZING OPERATION OF BATTERY PACK OF AN ELECTRIC VEHICLE

PRIORITY CLAIM

This U.S. patent application claims priority under 35 U.S.C. § 119 to: India Application No. 202021049089, filed on 10 Nov. 2020. The entire contents of the aforementioned application are incorporated herein by reference.

TECHNICAL FIELD

The disclosure herein generally relates to field of battery management of electric vehicles, and, more particularly, to a method and a system for optimizing the operation of battery pack of an electric vehicle.

BACKGROUND

Electric vehicles (EV) and hybrid electric vehicles (HEV) are getting importance due to the pollution caused by fossil fuel vehicles and the need for cleaner energy alternatives in cities. The electric vehicles have a plurality of batteries arranged in a battery pack. The battery pack in the electric vehicle forms an important part and is thus valued at around 40% of the cost of the EV. A battery management system (BMS) performs the basic tasks of charging the battery pack in the vehicle and monitoring the important variables in the battery like current, voltage and temperature so that the battery does not catch fire (thermal runaway), undercharge or degrade soon. Precise and reliable knowledge of the state of charge (SOC), the state of health (SOH) and the thermal state of individual batteries is essential for the BMS to work in an efficient manner. Further, an estimate of the remaining useful life (RUL) of the battery is an important feature for the BMS.

With battery systems getting more common it is important to augment the capabilities of the BMS system by enhancing the life and the energy density in the battery. Current, voltage and temperature recorded in the battery pack are being used to understand more about the behavior of the battery and optimize the use of the pack to enhance energy efficiency there by decreasing the overall running costs and battery recycling costs.

Mathematical models and simulation tools are available for prediction of SOH, SOC, etc. independently. Most of them also work off-line whereas the need is to have them work in an integrated manner in real-time using the real-time and historical data of the battery pack and the vehicle. The coupling of these models and tools is a challenging task.

SUMMARY

Embodiments of the present disclosure present technological improvements as solutions to one or more of the above-mentioned technical problems recognized by the inventors in conventional systems. For example, in one embodiment, a method for optimizing operation of a battery pack of an electric vehicle. The system comprises an input/output interface, one or more hardware processors and a memory. The input/output interface obtains a plurality of data related to the battery pack from a battery management system of the electric vehicle. The memory is in communication with the one or more hardware processors, wherein the one or more first hardware processors are configured to execute programmed instructions stored in the one or more first memories, to: pre-process the obtained plurality of data; extract a plurality of statistical features from the preprocessed plurality of data; generate a network thermal model for the battery pack using the preprocessed plurality of data, wherein the network thermal model is used to determine a thermal profile for each of a plurality of batteries in the battery pack; generate a state of health (SOH) model for predicting SOH of the plurality of batteries in the battery pack using the plurality of statistical features and the thermal profile; generate a state of charge (SOC) model for predicting SOC of the plurality of batteries of the battery pack using the plurality statistical features and the thermal profile; generate a solid electrolyte interface (SEI) layer model using the preprocessed plurality of data, wherein the SEI layer model is configured to predict the SOH of the plurality of batteries at the starting point of the battery pack; generate a cell balancing model to equalize the state of charge on each of the plurality of batteries of the battery pack; provide a set of constraints based on temperature rise in the battery pack and SOH of the plurality of batteries in the battery pack; optimize current for charging and discharging of the battery pack with the provided set of constraints using an objective function, wherein the objective function is a current profile for charging the plurality of batteries based on the inputs from the SOC model, the SOH model and cell balancing model given the set of constraints, wherein the optimization results in generation of an optimum current profile; and provide the optimum current profile to the battery management system to act upon it and provide the settings corresponding to the optimum current profile to the electric vehicle.

In another aspect, a method for optimizing the operation of a battery pack of an electric vehicle is provided. Initially a plurality of data related to the battery pack is obtained from a battery management system of the electric vehicle. The obtained plurality of data is then preprocessed. Further, a plurality of statistical features is extracted from the preprocessed plurality of data. A network thermal model is then generated for the battery pack using the preprocessed plurality of data, wherein the network thermal model is used to determine a thermal profile for each of a plurality of batteries in the battery pack. In the next step, a state of health (SOH) model is generated for predicting SOH of the plurality of batteries in the battery pack using the plurality of statistical features and the thermal profile. Further a state of charge (SOC) model is generated for predicting SOC of the plurality of batteries of the battery pack using the plurality statistical features and the thermal profile. In the next step, a solid electrolyte interface (SEI) layer model is generated using the preprocessed plurality of data, wherein the SEI layer model is configured to predict the SOH of the plurality of batteries at the starting point of the battery pack. In the next step, a cell balancing model is generated to equalize the state of charge on each of the plurality of batteries of the battery pack. Further, a set of constraints based on temperature rise is provided in the battery pack and SOH of the plurality of batteries in the battery pack. In the next step, a current for charging and discharging of the battery pack is optimized with the provided set of constraints using an objective function, wherein the objective function is a current profile for charging the plurality of batteries based on the inputs from the SOC model, the SOH model and cell balancing model given the set of constraints, wherein the optimization results in generation of an optimum current profile. Finally, the optimum current profile is provided to the battery management system to act upon it and provide the settings corresponding to the optimum current profile to the electric vehicle.

In yet another aspect, there are provided one or more non-transitory machine-readable information storage mediums comprising one or more instructions which when executed by one or more hardware processors cause optimizing the operation of a battery pack of an electric vehicle is provided. Initially a plurality of data related to the battery pack is obtained from a battery management system of the electric vehicle. The obtained plurality of data is then preprocessed. Further, a plurality of statistical features is extracted from the preprocessed plurality of data. A network thermal model is then generated for the battery pack using the preprocessed plurality of data, wherein the network thermal model is used to determine a thermal profile for each of a plurality of batteries in the battery pack. In the next step, a state of health (SOH) model is generated for predicting SOH of the plurality of batteries in the battery pack using the plurality of statistical features and the thermal profile. Further a state of charge (SOC) model is generated for predicting SOC of the plurality of batteries of the battery pack using the plurality statistical features and the thermal profile. In the next step, a solid electrolyte interface (SEI) layer model is generated using the preprocessed plurality of data, wherein the SEI layer model is configured to predict the SOH of the plurality of batteries at the starting point of the battery pack. In the next step, a cell balancing model is generated to equalize the state of charge on each of the plurality of batteries of the battery pack. Further, a set of constraints based on temperature rise is provided in the battery pack and SOH of the plurality of batteries in the battery pack. In the next step, a current for charging and discharging of the battery pack is optimized with the provided set of constraints using an objective function, wherein the objective function is a current profile for charging the plurality of batteries based on the inputs from the SOC model, the SOH model and cell balancing model given the set of constraints, wherein the optimization results in generation of an optimum current profile. Finally, the optimum current profile is provided to the battery management system to act upon it and provide the settings corresponding to the optimum current profile to the electric vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
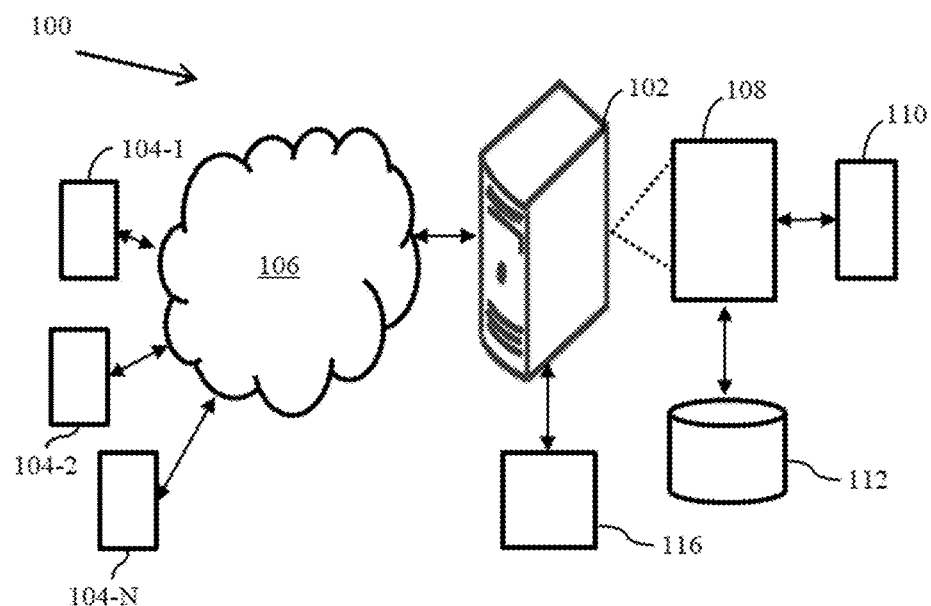
FIG. 1 illustrates a block diagram of a system for optimizing the operation of a battery pack of an electric vehicle according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 14B, where similar reference characters denote corresponding features consistently throughout the figures, there are shown preferred embodiments and these embodiments are described in the context of the following exemplary system and/or method.

FIG. 1 illustrates a block diagram of a system 100 for optimizing the operation of a battery pack (not shown) in an electric vehicle, in accordance with an example embodiment. Although the present disclosure is explained considering that the system 100 is implemented on a server in the cloud, it may also be present elsewhere such as a local machine or in the vehicle control system itself. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 ... 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
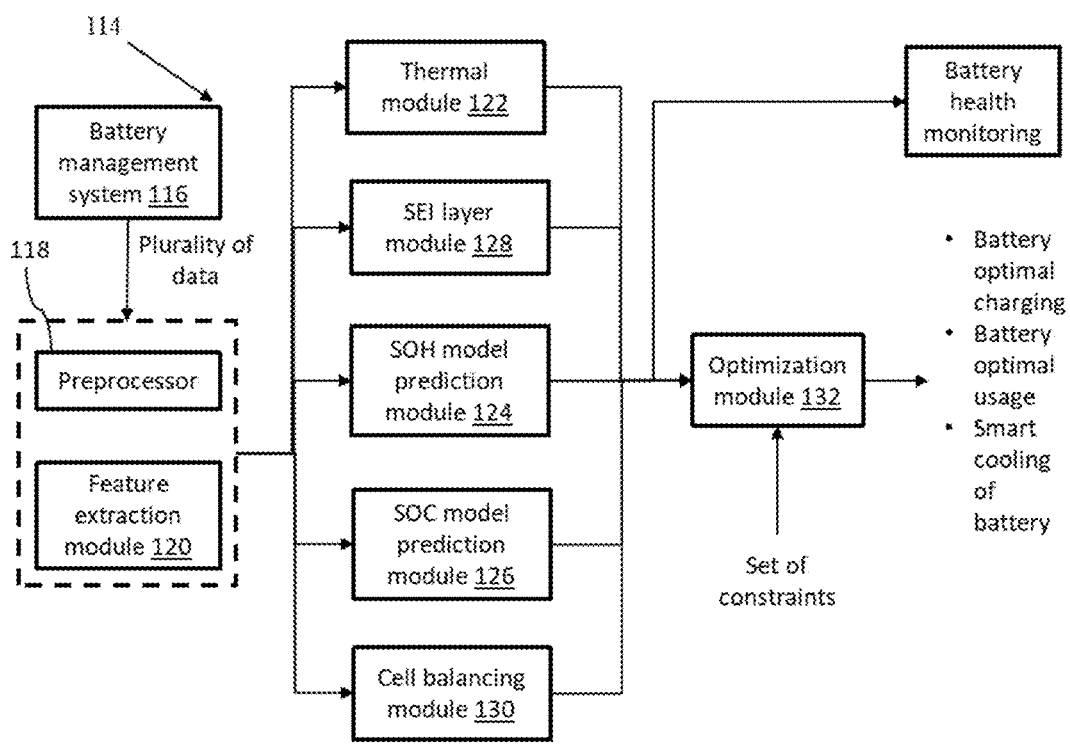
FIG. 2 is a functional block diagram of a digital twin used in the system of FIG. 1 according to some embodiments of the present disclosure.
Figure 3:
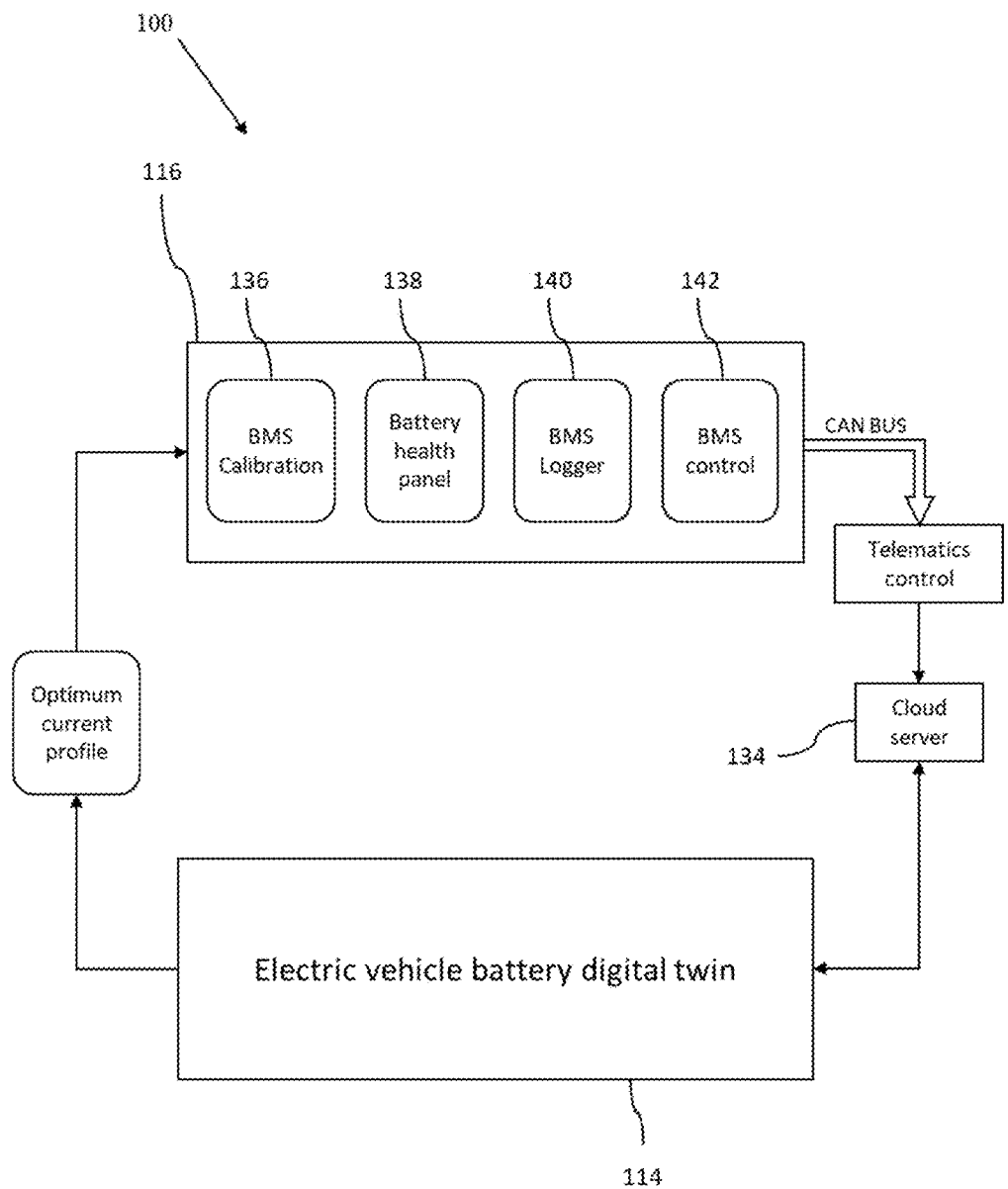
FIG. 3 shows a functional flow diagram of the system of FIG. 1 for optimizing the operation of a battery pack of an electric vehicle according to some embodiments of the present disclosure.
Figure 4:
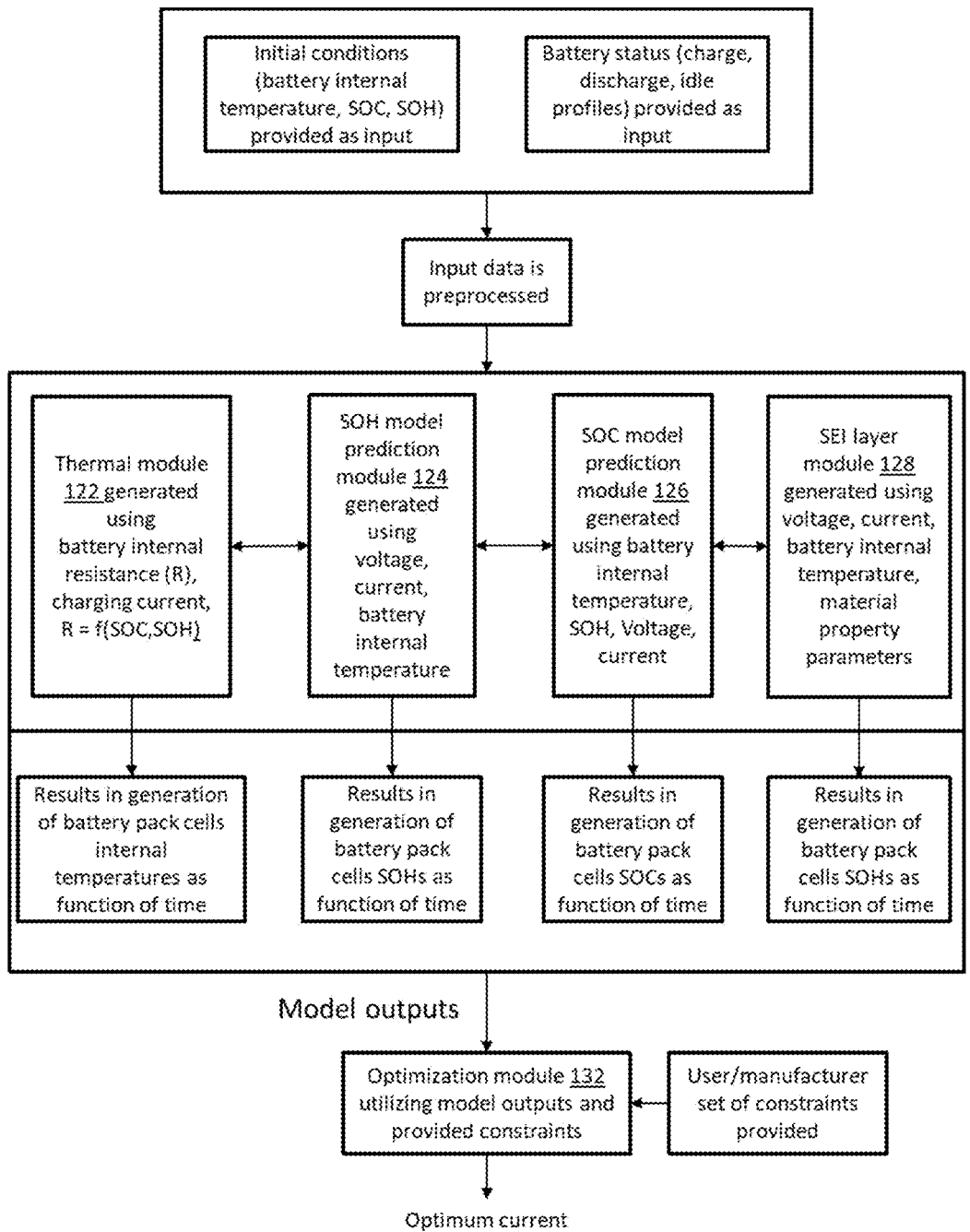
FIG. 4 shows a block diagram showing flow of data along a plurality of modules of the system of FIG. 1 according to some embodiment of the present disclosure.

According to an embodiment of the disclosure, the system 100 is configured to optimize the operation of the battery pack of the electric vehicle as shown in block diagram of FIG. 1. The system 100 utilizes a digital twin 114 which is configured to operate along with a battery management system 116 (BMS) of the electric vehicle as shown in FIG. 2, FIG. 3 and FIG. 4. FIG. 2 shows a block diagram of the digital twin 114. FIG. 3 shows a functional flow diagram of the system for optimizing the operation of a battery pack of an electric vehicle. FIG. 4 shows the block diagram showing flow of data along a plurality of modules of the system 100. The system 100 obtains the data from the BMS 116 and preprocesses it. The digital twin 114 covers all aspects of optimizing the battery pack by providing cell balancing, SEI layer estimation, estimate of the thermal profile, state of charge (SOC), state of health (SOH) during charging and discharging of the battery pack as well as an estimate of the remaining useful life (RUL) of the battery using the acquired state of health information.

The state of charge (SOC) of a battery is the level of charge of the battery relative to its capacity. Knowing the SOC allows estimation of how long the battery can continue to supply energy at a given current along with the known capacity of the battery. The state of health (SOH), is a measurement of the point that has been reached in the life cycle of the battery with respect to its original capacity. Once the SOH is known, probabilistic estimation of remaining useful life (RUL) of the battery pack can be made, which shall also take into account the pattern of driving of the electric vehicle. The thermal history of a battery conditions its performances because the chemical reactions and transport phenomena involved in the electrochemical systems are thermally activated.

The digital twin 114 includes a preprocessor 118, a feature extraction module 120, a thermal module 122, an SOH model prediction module 124, an SOC model prediction module 126, a solid electrolyte interface (SEI) layer model generation module 128, a cell balancing module 130, an optimization module 132 and remaining useful life (RUL) prediction module (not shown in figures).

According to an embodiment of the disclosure, the input/output interface 104 is configured to obtain a plurality of data related to the battery pack. The plurality of data may include, but not limited to the voltage and current history in the cells of the battery pack, inlet and outlet coolant temperatures, coolant flow rates, surface temperatures on battery through available temperature sensors, and log of battery initial states which shall include battery capacity related information as well. The digital twin can also take the inputs of the battery characteristics from the manufacturer/OEM that could be obtained from a laboratory testing. The digital twin 114 can also take inputs from the battery sensors on temperature at certain locations, coolant flow rates, coolant temperature, ambient temperature, load on the vehicle, current and voltages from the pack. The plurality of data is preprocessed by the preprocessor 118. The preprocessor 118 obtains data from the BMS 116 and filters the data using statistical tools for outlier analysis, and filter the data using but not restricted to filter like extended Kalman filter (EKF).

According to an embodiment of the disclosure, the feature extraction module 120 is configured to extract a plurality of statistical features from the preprocessed plurality of data. The plurality of statistical features include mean and kurtosis. The feature extraction module 120 can also be termed feature building module, which is configured to calculate the value of various new features defined using logged data.

According to an embodiment of the disclosure, the thermal module 122 is configured to generate a surface and internal temperature distribution for the battery pack on each cell on the battery using the preprocessed plurality of data. The thermal module 122 is used to determine a thermal profile for each of a plurality of batteries in the battery pack.

According to an embodiment of the disclosure, the SOH prediction module 124 is configured to generate a state of health (SOH) model for predicting SOH of the plurality of batteries in the battery pack using the plurality of statistical features and the generated thermal profile. Further, the predicted SOH is configured to estimate a probabilistic estimate of the remaining useful life (RUL) of the battery.

According to an embodiment of the disclosure, the SOC model prediction module 126 is configured to generate a state of charge (SOC) model for predicting SOC of the plurality of batteries of the battery pack using the plurality statistical features, manufacturer's inputs using laboratory data and the generated thermal profile.

According to an embodiment of the disclosure, the SEI layer module 128 is configured to generate a solid electrolyte interface (SEI) layer model using the preprocessed plurality of data, wherein the SEI layer model is used as a proxy to predict the SOH of the plurality of batteries at the starting point of the battery pack, when laboratory data for data based SOH model is not available. Though it should be appreciated that the in another embodiment, SEI layer model may also be used as a substitute and augmenter to data based SOH model when data for the SOH model is small or not available. The electric vehicle industry relies heavily on Li-ion batteries for power storage. It has been observed that the battery capacity decreases with prolonged charge-discharge cycling, accompanied by a rapid heating of the cell. This phenomenon known as 'ageing' of the cell is important to understand in order to increase the life of the battery. Capacity loss of a battery and power fading over time are chiefly attributed to the formation of SEI (Solid Electrolyte interface) layer. This SEI layer is like a passivation film that forms due to the electrolyte decomposition and other side reactions that take place at the electrode surface.

According to an embodiment of the disclosure, the cell balancing module 130 is configured to control the BMS efficiently to equalize the state of charge on each of the plurality of batteries of the battery pack.

According to an embodiment of the disclosure, the optimization module 132 is configured to optimize a current for charging and discharging of the battery pack with the provided set of constraints using an objective function. Initially, the set of constraints are provided based on overall temperature rise, capacity fade change and energy loss in the battery. The objective function aims to generate an optimum current profile for charging the plurality of batteries based on the inputs from the SOC model, the SOH model and cell balancing model given the set of constraints, wherein the optimization results in generation of an optimum current profile. The objective function is also used for load distribution among the batteries while the EV is running and hence results in an optimum discharging profile. Algorithms for solving the optimization problem include but not restrictive to artificial bee colony, particle swarm optimization and other heuristic and gradient based algorithms.

The optimization module 132 is configured to optimize the time of charging based on constraining the capacity fade, temperature rise, energy loss or a combination of all of these. The optimum current profile would be provided back to the BMS. For optimal discharge of the battery, at the requested load, the digital twin distributes the current among the battery cells to minimize the capacity fade and temperature rise inside the battery pack.

Further, the digital twin 114 is configured to provide the optimum current profile to the battery management system 116 to act upon and provide the settings corresponding to the optimum current profile to the electric vehicle. The predicted SOC and SOH of the battery pack is displayed on a display device (not shown in the figures) of the battery management system 116. The display device is visible to the electric vehicle driver and helps in making decisions regarding battery health. Similarly, the temperature distribution seen inside the battery is used to cool start the cooler fan or coolant pump (in case of liquid coolant) and distribute the coolant according to the temperature distribution in the battery pack.

The overall flow of information from the battery digital twin 114 to the BMS 116 and back is shown in the schematic diagram of FIG. 3. The digital twin 114 resides either in a cloud server 134 or on the BMS 116 or partly in the cloud server 134 and partly in the BMS 116. The reason why the digital twin 114 operates from two places is that some algorithms which run slower in the BMS 116 (with limited computational capability) can be run on the much faster cloud server 134. Depending on the type of the electric vehicle and the microprocessor speed in the BMS 116 of the electric vehicle, the digital twin 114 could be placed within the electric vehicle itself.

The BMS 116 comprises a BMS calibration 136 for calibrating the BMS 116, a battery health panel 138 for displaying the health of the battery pack, a BMS logger 140 and a BMS control. The BMS logger 140 of the electric vehicle records information about the battery current, voltage and temperatures in battery pack and the coolant inlet and outlet flows rates and temperatures based on the sensors provided in the battery pack as a function of time. The BMS 116 transmits the information to the digital twin 114 through a CAN BUS interface. The information is encrypted for transmission through the network. A BMS control 142 is part of the standard BMS that monitors the batteries in the battery pack for protection against thermal runaway and fluctuations in the capacities of the cells.

The SOC model, the SOH model and the SEI layer model are capable of self-learning when new data for SOH, SOC are available from the battery pack of the electric vehicle. The model can learn from the initial laboratory data where SOC and SOH has been measured for different voltage, current and temperature in the battery cells. The self-learning model can learn from the data obtained when SOH measurements are available for the each battery along with the data from the BMS logger, using known techniques of self-learning.

Figure 5A:
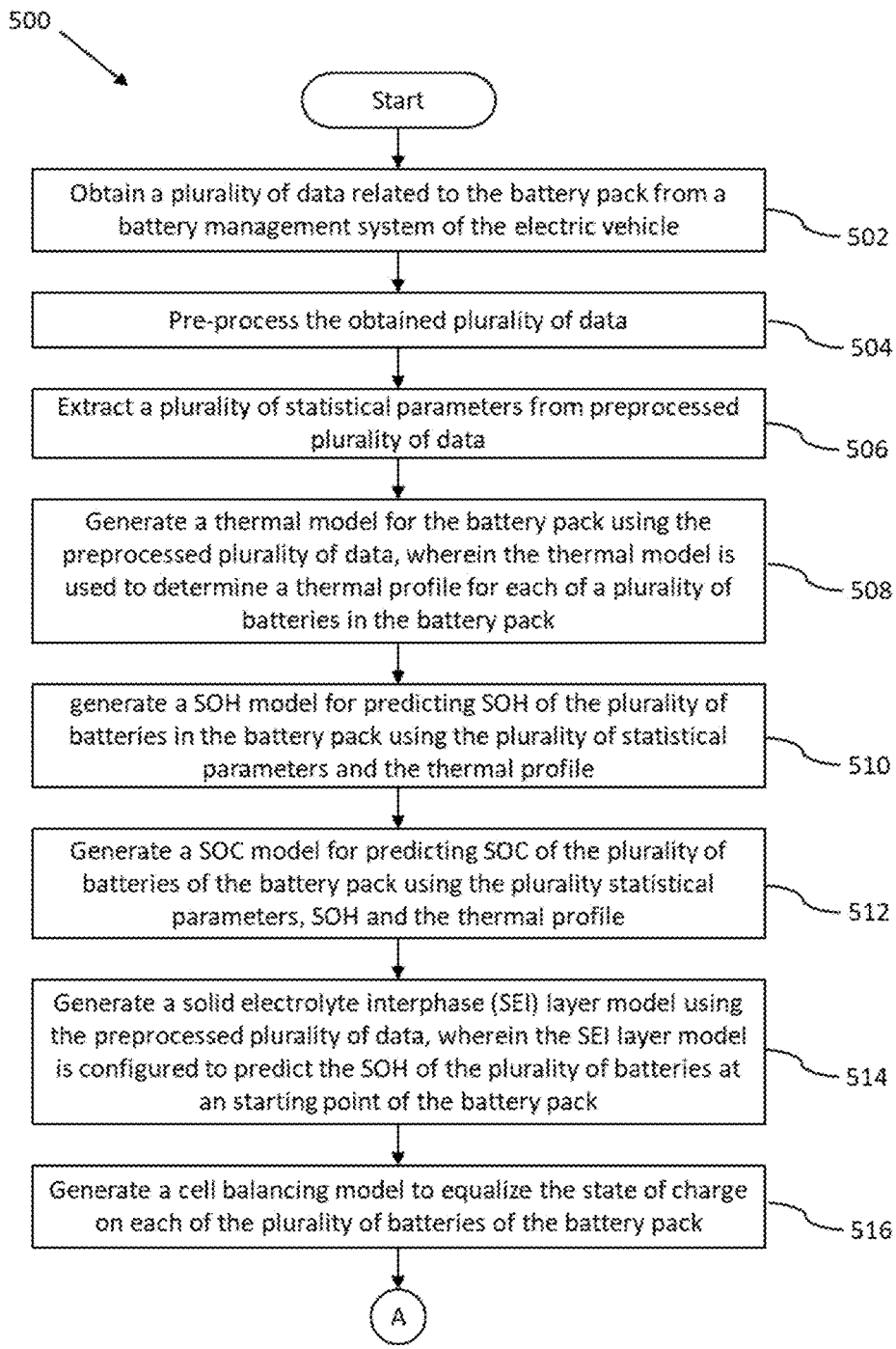
FIG. 5A-5B illustrates a flowchart of a method for optimizing the operation of battery pack of an electric vehicle according to some embodiments of the present disclosure.
Figure 5B:
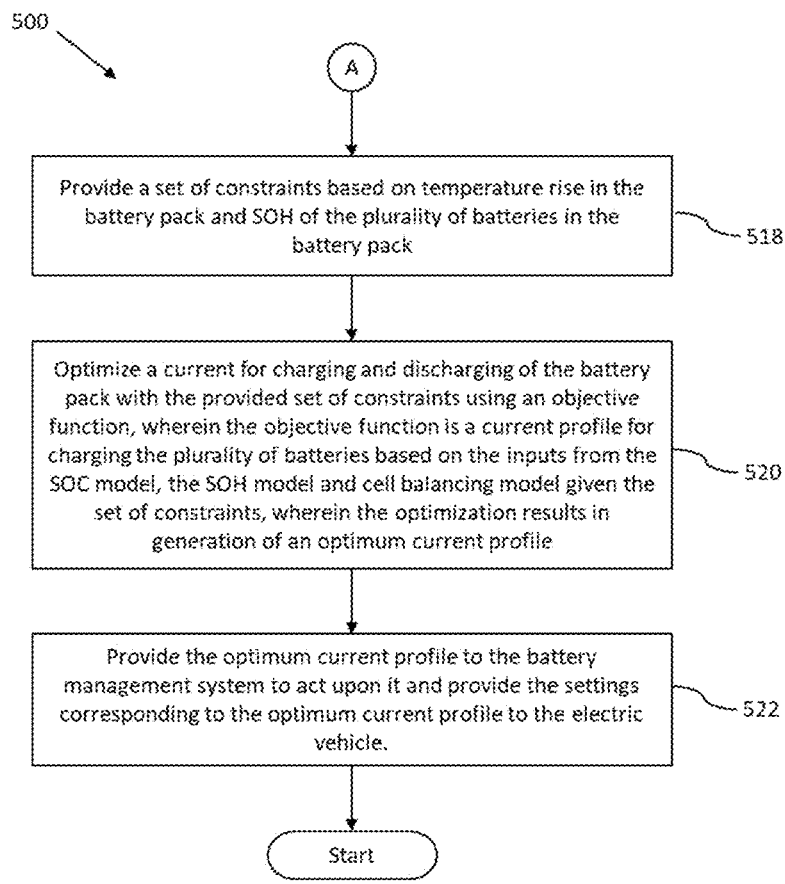

In operation, a flowchart 500 for optimizing operation of a battery pack of an electric vehicle is shown in FIG. 5A-5B. Initially at step 502, the plurality of data related to the battery pack is obtained from a battery management system of the electric vehicle via the input/output interface. At step 504, the obtained plurality of data is preprocessed. At step 506, the plurality of statistical features is extracted from the preprocessed plurality of data. Later at step 508, the network thermal model is generated for the battery pack using the preprocessed plurality of data, wherein the network thermal model is used to determine a thermal profile for each of a plurality of batteries in the battery pack. At step 510, the state of health (SOH) model is generated for predicting SOH of the plurality of batteries in the battery pack using the plurality of statistical features and the thermal profile. AT step 512, the state of charge (SOC) model is generated for predicting SOC of the plurality of batteries of the battery pack using the plurality statistical features and the thermal profile. At step 514, the solid electrolyte interface (SEI) layer model is generated using the preprocessed plurality of data, wherein the SEI layer model is configured to predict the SOH of the plurality of batteries at the starting point of the battery pack, the SEI layer model can also be used for predicting the SOH while the EV is running in the absence of laboratory tests for data based SOH model. Further at step 516, the cell balancing model is generated to equalize the state of charge on each of the plurality of batteries of the battery pack. At step 518, the set of constraints are provided based on temperature rise in the battery pack and SOH of the plurality of batteries in the battery pack. At step 520, an optimum current profile for charging and discharging of the battery pack is obtained using an objective function and a set of constraints, wherein the objective function is a current profile for charging the plurality of batteries based on the inputs from the SOC model, the SOH model and cell balancing model. And finally at step 522, the optimum current profile is provided to the battery management system 116 to act upon it and provide the settings corresponding to the optimum current profile to the electric vehicle.

According to an embodiment of the disclosure, the system 100 can also be explained with the help of following examples. The example below shows the working of the SOH, SOC, thermal and optimal charging models.

Figure 8:
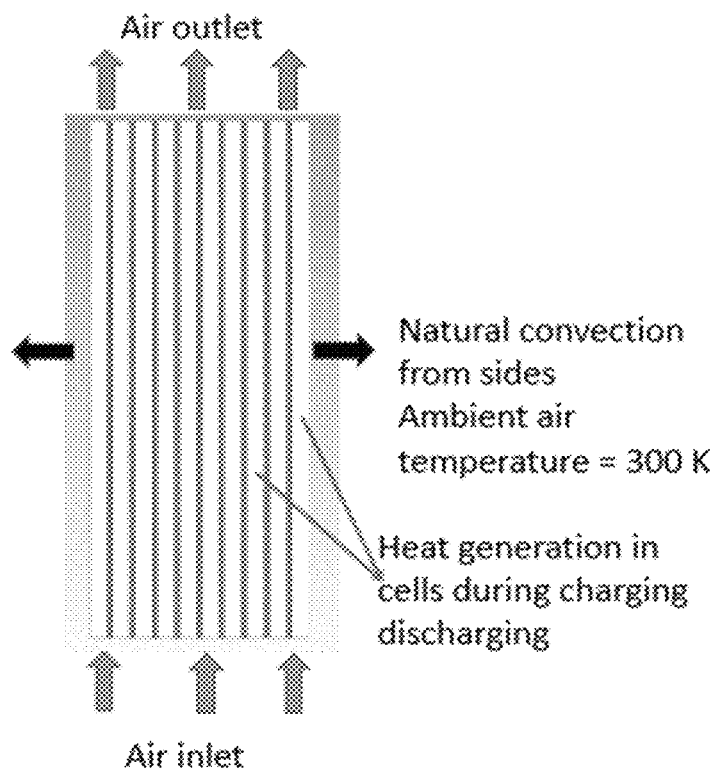
FIG. 8 shows a schematic of a cell assembly of the system of FIG. 1 according to some embodiments of the present disclosure.
Figure 9:
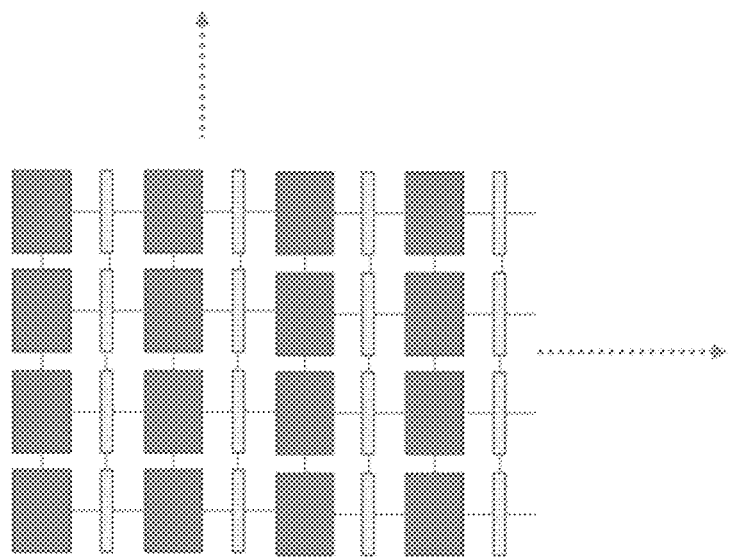
FIG. 9 shows a schematic layout of a network thermal model of the system of FIG. 1 according to some embodiments of the present disclosure.
Figure 10:
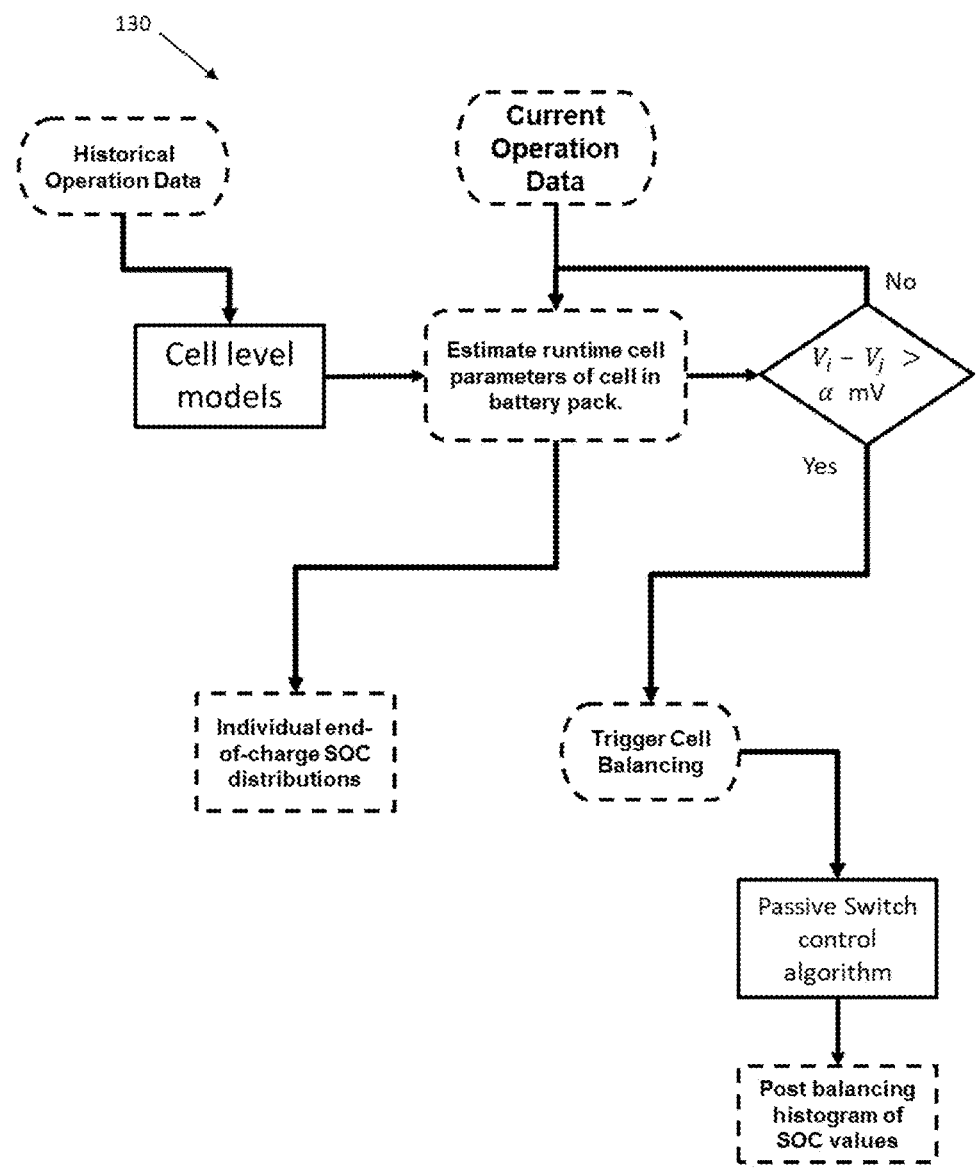
FIG. 10 shows a schematic diagram of a cell balancing module of the system of FIG. 1 according to some embodiments of the present disclosure.

Network thermal model: The network thermal model is built for a battery that has a capacity of 33.1 Ah. The battery cells, 10 of them are stacked in vertical row with air cooling happening between them. The battery is discharged at 1.5 C. Free convection on five sides of the battery was modeled with assumed heat transfer coefficient. The temperature distribution inside the battery is calculated using a lumped parameter thermal model for the battery elements and compared with solution from a high fidelity computational fluid dynamics (CFD) model. The schematic of the cell assembly is shown in FIG. 8.

The comparison of CFD solution with time is provided at different times for an air flow rate of 1 m/s in free space. As it can be seen, the agreement between CFD and lumped parameter models is reasonably good. The lumped parameter model takes a fraction of time to run compared to the CFD model. The layout of the model is described in FIG. 9. The equations (1) and (2) show how the battery temperature is calculated along with surrounding and coolant temperatures. The battery properties are mass and specific heat of battery, the coolant properties are coolant density, flow rate, specific heat and inlet temperature. The heat generation in the battery is denoted by Q that is dependent on the internal resistance of the battery.

$$mc_p \frac{dT}{dt} = -hA(T - T_{sur}) + Q \qquad (1)$$

$$m_{fl} c_{pl} T_{out} = m_{fl} c_{pl} T_{in} - hA(T_{out} - T) \qquad (2)$$

Where, m is the mass of the battery cell, $c_p$ specific heat of the battery cell, $m_{fl}$ is the mass flow rate of the liquid coolant, $c_{pl}$ is the specific heat of the fluid, h is the heat transfer coefficient between battery cell and surroundings, T is surface cell of the battery cell $T_{sur}$ is temperature the battery cell senses around it, $T_{in}$ and $T_{out}$ are the inlet and outlet coolant temperature in a particular coolant element, Q is the heat generation rate due to battery charging/discharging.

Figure 11A:
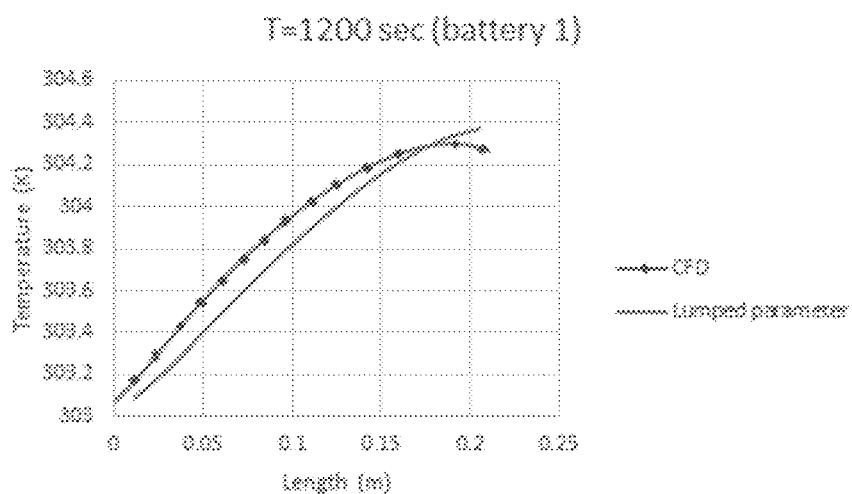
FIG. 11A and FIG. 11B illustrates a graphical representation of comparison between high fidelity computational fluid dynamics (CFD) and lumped parameter model according to some embodiments of the present disclosure.
Figure 11B:
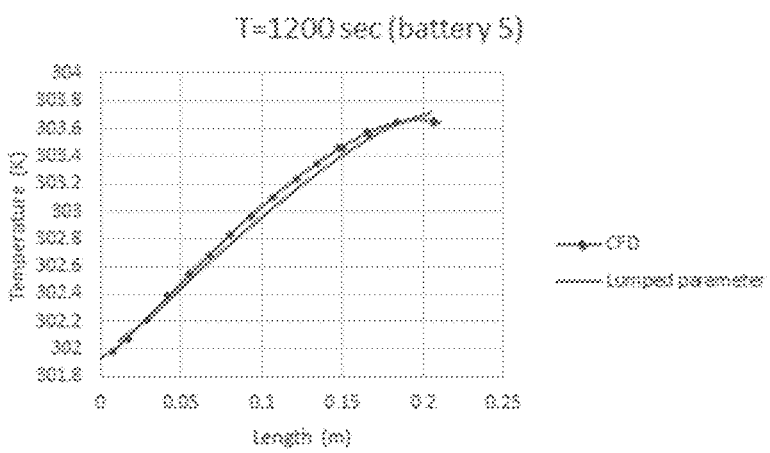

The graphs in FIG. 11A and FIG. 11B show the comparison between high fidelity computational fluid dynamics (CFD) and lumped parameter model simulations developed for battery cell 1 and 5 counted from left, at a particular time. The run time for the lumped parameter is a fraction of the run time for the CFD model.

SOH model: The SOH model is suitable for online implementation (real time), as it is based on real time data gathered from past to present and is computationally efficient. The SOH model is fast and simple for integration with BMS system. Estimating SOH plays a crucial role in the correct functioning of the implementation of optimal charging model as well, which takes into account the estimated SOH as one of the features as mentioned under 'capacity degradation'. It should further be appreciated that once SOH is estimated for the battery pack, it can be used to find out the RUL.

Figure 12:
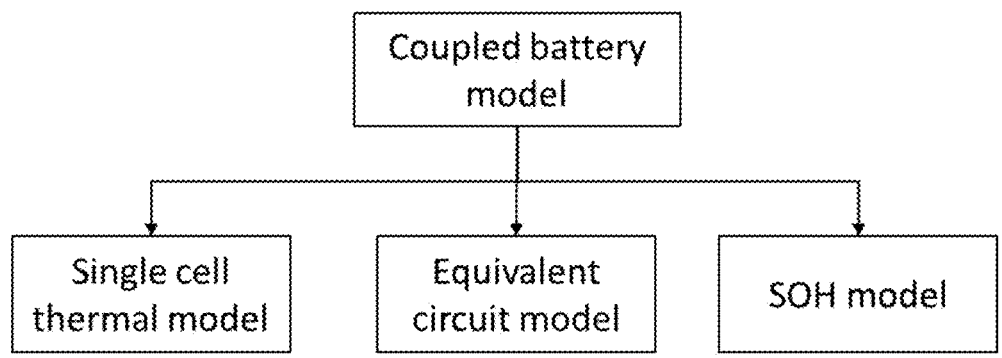
FIG. 12 shows schematic of coupled electro-thermal model of the system of FIG. 1 according to some embodiments of the present disclosure.

Optimal charging model: The schematic of coupled thermal-electro-chemical model is shown in FIG. 12. It consists of three submodules, a single cell thermal model, an equivalent circuit model for modeling the SOC of the battery, and the SOH model that could be data based or physics based as described earlier. The single cell thermal model uses resistances and capacitances to model the behavior of battery for heat generation. The single cell thermal model helps in determining the internal temperature of the battery from surface temperature. The equivalent circuit model for SOC calculation uses resistances and capacitances in series and parallel to model the behavior of the battery and is tuned based on laboratory data.

Figure 13A:
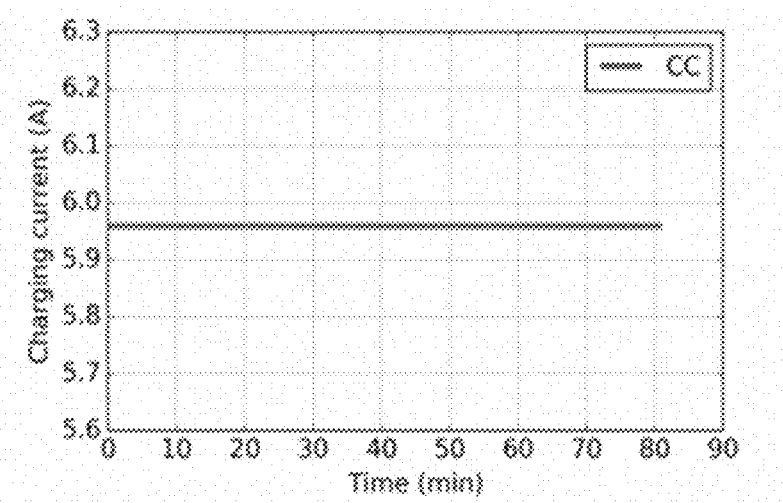
FIGS. 13A and 13B illustrates charging current profile and capacity change profile for a battery based on equal weightages during optimization for charging time, temperature rise, and capacity fade using charging optimization algorithm according to some embodiments of the present disclosure.
Figure 13B:
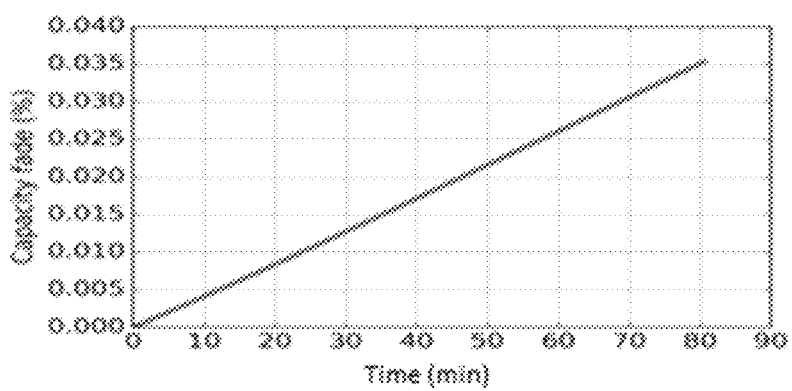

The thermal-electrochemical model utilizes profiles of the temperature rise, energy loss for the battery, capacity degradation, SOC of the battery as a function of time. Considering the case of $LiFePO_4$ battery with 10 Ah capacity, nominal voltage of 3.2 V: The battery is charged from SOC of 0.1 to 0.9. It is charged in the constant current (CC) mode until the voltage reaches 3.5 V and with constant voltage until the current in battery reduces to 0.1 mA as shown in graphical representation in FIG. 13A and FIG. 13B. FIGS. 13A and 13B illustrate charging current profile and capacity change profile for a battery based on equal weightages during optimization for charging time, temperature rise, and capacity fade using charging optimization algorithm. The four features and the weights for those in the CC-CV optimization is shown in TABLE 1 below.

TABLE 1

Weights for variable while optimizing in balanced mode and minimization mode

| Mode | Charging time | Energy loss | Temperature rise | Capacity fade |
| --- | --- | --- | --- | --- |
| Balanced mode | 0.25 | 0.25 | 0.25 | 0.25 |
| Minimization mode | 1.0 | 0 | 0 | 0 |

Optimal charging can be made modular by defining priorities or weights to the above variables while optimizing. For balanced mode, all four variables have equal weightage for optimization. For the minimization mode, charging time is the only feature that is considered for optimization.

Figure 14A:
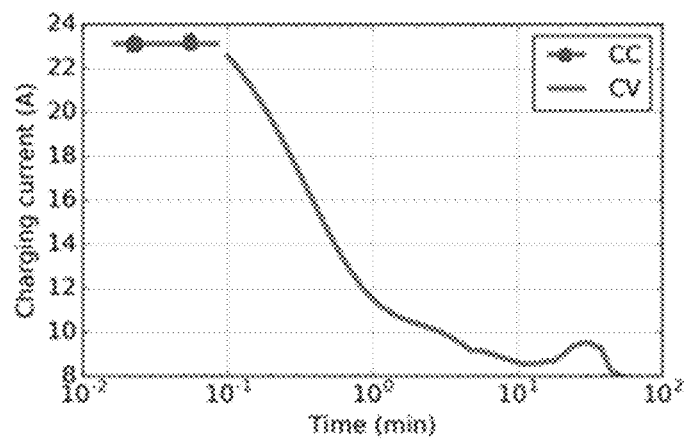
FIGS. 14A and 14B illustrates charging current profile and capacity change profile for a battery based on maximum weightage during optimization for charging time only using charging optimization algorithm according to some embodiments of the present disclosure.
Figure 14B:
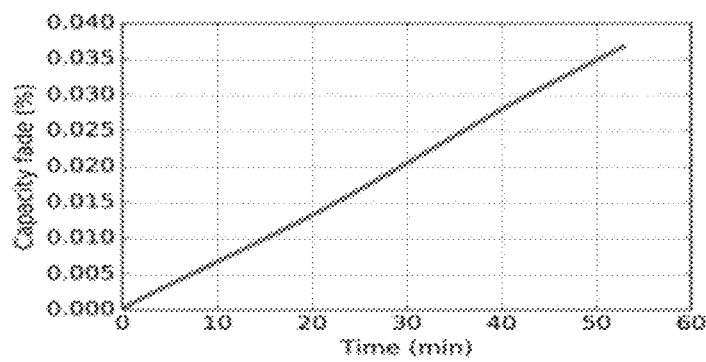

For the balanced mode the time of charging is 80 minutes and the capacity degradation for one cycle is 0.035% as shown in FIG. 14A and FIG. 14B. FIGS. 14A and 14B illustrates charging current profile and capacity change profile for a battery based on maximum weightage during optimization for charging time only using charging optimization algorithm.

For the minimization mode, where the only variable to minimize is the charging time, the charging time is 52 minutes and the capacity fade is 0.037% higher than the balanced mode. So it is possible to choose the variables that need to be optimized for charging.

According to another embodiment of the disclosure, the cell balancing of the battery pack comprises of multiple cells. Cell balancing methodology is triggered whenever the state of charge (SOC) of the cells of the batteries differ by a specific margin. Cell balancing is an integral part of the battery management system (BMS), though it is limited by computational requirements and rely on simple methods, which often turn out to be inefficient to find the difference in state of charge of the cells, and perform required cell balancing.

According to an embodiment of the disclosure, schematic diagram of the cell balancing module 130 is shown in FIG.

10. The cell balancing module 130 utilizes a plurality of cell level modules including physics-based or data-driven models, such as coulomb counting, and equivalent circuit models to estimate current SOC of the battery cells. First, parameters of the equivalent circuit i.e. open circuit voltage (OCV), series resistance ($R_0$) and RC circuit pair ($R_i$ & $C_i$) are calculated using historical data from the battery database for each pair i. Then, SOC is estimated (or calculated) for all the cells of the battery pack using current operation data. Terminal voltages $V_i$ for different cells act as the direct identifiers of the battery SOC. If the difference in terminal voltages of any two cells is found to be greater than a which is a user defined variable, cells are termed as imbalanced and cell balancing is triggered. Using the voltage imbalance measure, the spread in the SOC is analyzed to estimate the requirement to perform cell balancing. Further based on specified cell balancing technique as used by BMS system, switching control methodology comprising of resistive passive cell balancing, capacitive active cell balancing, inductor based active cell balancing techniques is implemented to incorporate required balancing.

According to an embodiment of the disclosure, implementing cell balancing based on software system allows cell level monitoring which might be absent in a general scenario. This includes monitoring the state of charge, state of health and the remaining useful life at the cell level of the battery pack. Optimal switching methodology includes commanding switches such that cell balancing is performed at an optimal rate. Digital twin performs a real time check with multiple switching methodologies and suggests the one which is giving optimal results and command the BMS accordingly.

SEI Layer module: The SEI layer module 128 is a physics based thermo-electrochemical model module that calculates the capacity fade of a battery due to the growth of SEI layer during cycling. The generated SEI layer model is called at the beginning of the simulation and uses electrode and electrolyte properties and other important electrochemical constants to calculate capacity fade value. The capacity fade value is then used to compute SOH. The SEI layer module 128 can serve as a substitute for the data-driven SOH model when laboratory data for training SOH model is not available.

Figure 6:
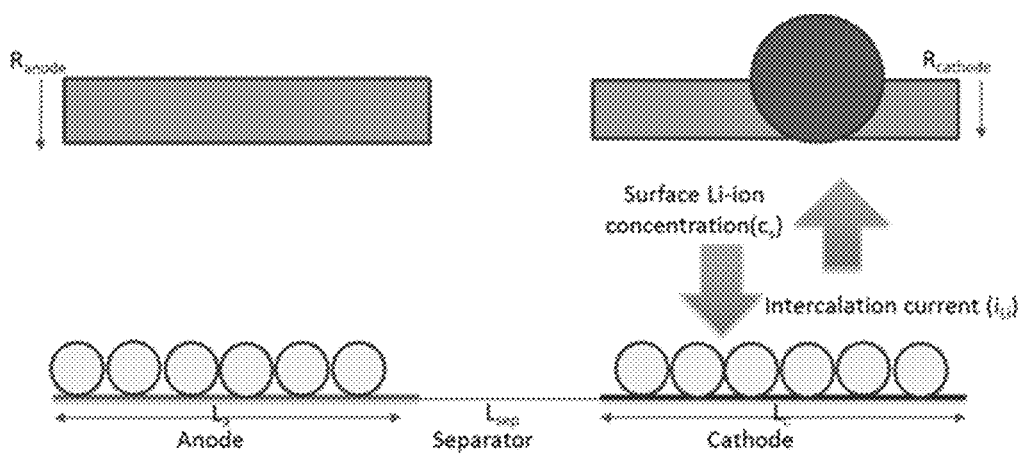
FIG. 6 shows schematic representation of a solid electrolyte interface (SEI) layer model according some embodiments of the present disclosure.

The SEI layer model simulates SEI layer formation using a multi-physics solver. The model takes into account different processes occurring simultaneously—the diffusional process of the solvent through the SEI layer, kinetic processes at the interface between liquid and solid phases, mass and charge transfer in the electrolyte and the electrodes, and heat generation within the cell. FIG. 6 outlines the modeling strategy. The electrodes are assumed to be composed of small spherical active particles. The electrolyte is assumed to be present in the electrodes as well as in the separator. The SEI layer is assumed to be formed on the anode alone. Two geometries have been created—one-dimensional (1-D) and two-dimensional (2-D) axial. In 1-D model, the charge, mass balance and energy equations have been solved. The Butler-Volmer equations require surface concentration of lithium ions. As the surface concentration of Li ions on the active particles changes spatially, the 2-D model have been used, where every coordinate in 1-D is mapped with 2-D. Firstly, the exchange current density is obtained (from Butler-Volmer expression in 1-D geometry at a coordinate) and passed on to the same mapped coordinate of the surface in 2-D. Then the diffusion equation in 2-D (indirect solving of diffusion in solid spherical active particle) is solved to obtain the surface concentration of Li-ions which is again passed on in return to the same mapped coordinate in 2-D model. In this way the two geometries are coupled using a feature available in a commercial multi-physics package. The thickness of SEI layer and concentration of electrolyte at every coordinate is also calculated. In this way, the spatial variation of current along with SEI layer thickness is obtained.

Figure 7:
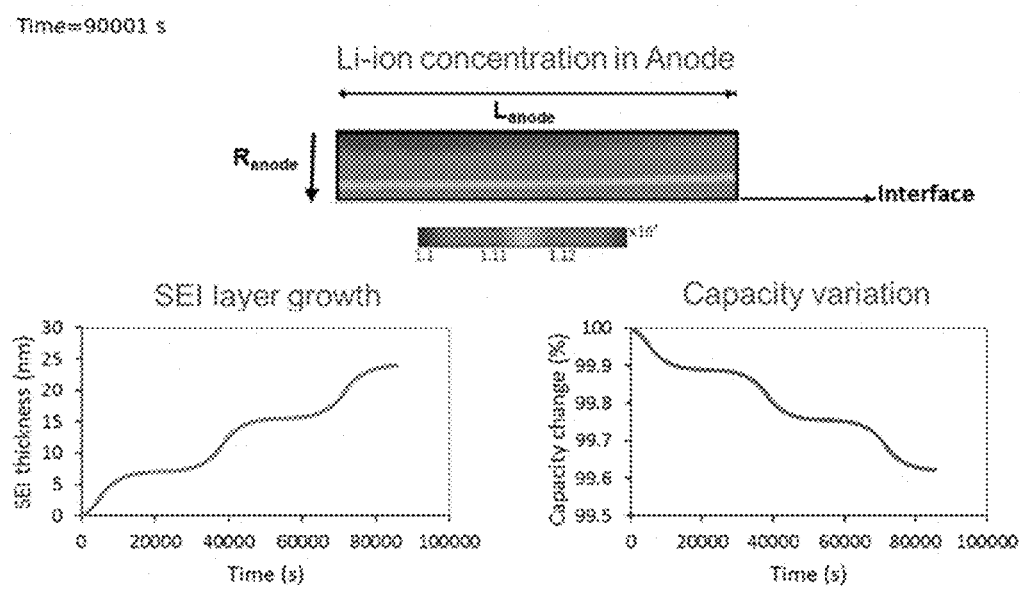
FIG. 7 shows the growth of SEI layer and the fading of capacity with time according to some embodiment of the present disclosure.

FIG. 7 shows the growth of SEI layer and the fading of capacity with time. Also seen is the lithium ion concentration at the anode during charging and discharging. During charging, the anode accepts the Li-ion from the interface. Thus, the concentration of Li-ion is high at the interface. On the other hand, the anode releases the Li-ion through the interface during discharging. Thus, the concentration of Li-ion is lower at the interface and high at the core. As far as the SEI layer is concerned, it grows with increased charge and discharge cycles. However, the growth is maximum after the first discharge. Growth slows down with every cycle. This decrease in the growth of SEI layer with every cycle can be attributed to (1) the decreased diffusion of electrolyte solution (2) increased cell impedance.

The important factors that affect the SEI layer growth and the capacity fade of the battery were found to be—type of graphite, electrolyte decomposition, electrochemical conditions and temperature. The model simulations shown in FIG. 7 are indicative of the growth of the SEI layer over several battery cycles and the corresponding capacity fading.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of effectively managing the operation of battery pack of the electric vehicle. The embodiments, thus provide the method and system for optimizing the operation of the battery pack of the electric vehicle.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor implemented method for optimizing operation of a battery pack of an electric vehicle (EV), the method comprising:
    obtaining, via an input/output interface a plurality of data related to the battery pack from a battery management system of the electric vehicle;
    preprocessing, via a one or more hardware processors, the obtained plurality of data;
    extracting, via the one or more hardware processors, a plurality of statistical features from the preprocessed plurality of data;
    generating, via the one or more hardware processors, a network thermal model for the battery pack using the preprocessed plurality of data, wherein the network thermal model is used to determine a thermal profile for each of a plurality of batteries in the battery pack;
    generating, via the one or more hardware processors, a state of health (SOH) model for predicting SOH of the plurality of batteries in the battery pack using the plurality of statistical features and the thermal profile;
    generating, via the one or more hardware processors, a state of charge (SOC) model for predicting SOC of the plurality of batteries of the battery pack using the plurality statistical features and the thermal profile;
    generating, via the one or more hardware processors, a solid electrolyte interface (SEI) layer model using the preprocessed plurality of data, wherein the SEI layer model is configured to predict the SOH of the plurality of batteries at a starting point of the battery pack;
    generating, via the one or more hardware processors, a cell balancing model to equalize the state of charge on each of the plurality of batteries of the battery pack;
    providing, via the one or more hardware processors, a set of constraints based on temperature rise in the battery pack and SOH of the plurality of batteries in the battery pack;
    optimizing, via the one or more hardware processors, a current for charging and discharging of the battery pack with the provided set of constraints using an objective function, wherein the objective function is a current profile for charging the plurality of batteries based on the inputs from the SOC model, the SOH model and cell balancing model given the set of constraints, wherein the step of optimizing results in generation of an optimum current profile; and
    providing, via the one or more hardware processors, the optimum current profile to the battery management system to act upon it and provide the settings corresponding to the optimum current profile to the electric vehicle.

2. The method of claim 1 further comprising distributing the load among all the batteries of the battery pack for optimal discharging of the battery to minimize the capacity fade and temperature rise inside the battery pack.

3. The method of claim 1, wherein the optimization is performed using one or more of artificial bee colony algorithm, particle swarm optimization algorithm and a heuristic and gradient based algorithm.

4. The method of claim 1, wherein the SEI layer model is a physics based model and uses material and electrochemical properties of the plurality of batteries to compute the capacity fade which is further used to calculate SOH.

5. The method of claim 1, wherein the plurality of data comprises one or more of inputs from the battery sensors on temperature at certain locations, coolant flow rates, coolant temperature, ambient temperature, load on the electric vehicle, current and voltages from the battery pack.

6. The method of claim 1, wherein the plurality of statistical features comprises one or more of mean and kurtosis.

7. The method of claim 1, wherein the plurality of data comprises voltage and current history in the cells of the battery pack, inlet and outlet coolant temperatures, coolant flow rates, surface temperatures on battery through available temperature sensors, and log of battery initial states.

8. The method of claim 1 further comprising estimation of remaining useful life (RUL) of the battery pack, wherein RUL accounts the pattern of driving of the electric vehicle.

9. A system for optimizing operation of a battery pack of an electric vehicle, the system comprises:
    an input/output interface for obtaining a plurality of data related to the battery pack from a battery management system of the electric vehicle;

one or more hardware processors; and
a memory in communication with the one or more hardware processors, wherein the one or more first hardware processors are configured to execute programmed instructions stored in the one or more first memories, to:
pre-process the obtained plurality of data;
extract a plurality of statistical features from the pre-processed plurality of data;
generate a network thermal model for the battery pack using the preprocessed plurality of data, wherein the network thermal model is used to determine a thermal profile for each of a plurality of batteries in the battery pack;
generate a state of health (SOH) model for predicting SOH of the plurality of batteries in the battery pack using the plurality of statistical features and the thermal profile;
generate a state of charge (SOC) model for predicting SOC of the plurality of batteries of the battery pack using the plurality statistical features and the thermal profile;
generate a solid electrolyte interface (SEI) layer model using the preprocessed plurality of data, wherein the SEI layer model is configured to predict the SOH of the plurality of batteries at a starting point of the battery pack;
generate a cell balancing model to equalize the state of charge on each of the plurality of batteries of the battery pack;
provide a set of constraints based on temperature rise in the battery pack and SOH of the plurality of batteries in the battery pack;
optimize current for charging and discharging of the battery pack with the provided set of constraints using an objective function, wherein the objective function is a current profile for charging the plurality of batteries based on the inputs from the SOC model, the SOH model and cell balancing model given the set of constraints, wherein the optimization results in generation of an optimum current profile; and
provide the optimum current profile to the battery management system to act upon it and provide the settings corresponding to the optimum current profile to the electric vehicle.

10. The system of claim 9 further comprising distributing the load among all the batteries of the battery pack for optimal discharging of the battery to minimize the capacity fade and temperature rise inside the battery pack.

11. The system of claim 9, wherein the optimization is performed using one or more of artificial bee colony algorithm, particle swarm optimization algorithm and a heuristic and gradient based algorithm.

12. The system of claim 9, wherein the SEI layer model is a physics-based model and uses material and electrochemical properties of the plurality of batteries to compute the capacity fade which is further used to calculate SOH.

13. The system of claim 9, wherein the plurality of data comprises one or more of inputs from the battery sensors on temperature at certain locations, coolant flow rates, coolant temperature, ambient temperature, load on the electric vehicle, current and voltages from the battery pack.

14. The system of claim 9, wherein the plurality of statistical features comprises one or more of mean and kurtosis.

15. The system of claim 9, wherein the plurality of data comprises voltage and current history in the cells of the battery pack, inlet and outlet coolant temperatures, coolant flow rates, surface temperatures on battery through available temperature sensors, and log of battery initial states.

16. One or more non-transitory machine readable information storage mediums comprising one or more instructions which when executed by one or more hardware processors cause managing a plurality of events, the instructions cause:
obtaining, via an input/output interface, a plurality of data related to the battery pack from a battery management system of the electric vehicle;
preprocessing the obtained plurality of data;
extracting a plurality of statistical features from the pre-processed plurality of data;
generating a network thermal model for the battery pack using the preprocessed plurality of data, wherein the network thermal model is used to determine a thermal profile for each of a plurality of batteries in the battery pack;
generating a state of health (SOH) model for predicting SOH of the plurality of batteries in the battery pack using the plurality of statistical features and the thermal profile;
generating a state of charge (SOC) model for predicting SOC of the plurality of batteries of the battery pack using the plurality statistical features and the thermal profile;
generating a solid electrolyte interface (SEI) layer model using the preprocessed plurality of data, wherein the SEI layer model is configured to predict the SOH of the plurality of batteries at a starting point of the battery pack;
generating a cell balancing model to equalize the state of charge on each of the plurality of batteries of the battery pack;
providing a set of constraints based on temperature rise in the battery pack and SOH of the plurality of batteries in the battery pack;
optimizing a current for charging and discharging of the battery pack with the provided set of constraints using an objective function, wherein the objective function is a current profile for charging the plurality of batteries based on the inputs from the SOC model, the SOH model and cell balancing model given the set of constraints, wherein the step of optimizing results in generation of an optimum current profile; and
providing the optimum current profile to the battery management system to act upon it and provide the settings corresponding to the optimum current profile to the electric vehicle.

* * * * *